United States Patent [19]

Park

[11] Patent Number: 5,301,897
[45] Date of Patent: Apr. 12, 1994

[54] REEL BRAKE DEVICE OF DECK IN CAMERA-INTEGRATED TYPE VIDEO CASSETTE RECORDER SYSTEM

[75] Inventor: Il M. Park, Seoul, Rep. of Korea

[73] Assignee: Goldstar Co., Ltd., Seoul, Rep. of Korea

[21] Appl. No.: 923,622

[22] Filed: Aug. 3, 1992

[30] Foreign Application Priority Data

Aug. 3, 1991 [KR] Rep. of Korea ............... 13470/1991

[51] Int. Cl.$^5$ ............................................. G11B 15/18
[52] U.S. Cl. ......................................................... 242/204
[58] Field of Search ............... 242/201, 202, 204, 206, 242/208, 209, 210; 360/85, 95, 96.1, 96.2, 96.3, 96.4

[56] References Cited

U.S. PATENT DOCUMENTS

| | | | |
|---|---|---|---|
| 4,695,906 | 9/1987 | Kim | 360/95 X |
| 5,086,359 | 2/1992 | Tsuchiya | 360/85 X |

*Primary Examiner*—Daniel P. Stodola
*Assistant Examiner*—John P. Darling

[57] ABSTRACT

A reel brake device of a deck in a camera-integrated type video cassette recorder system, comprising a pinch arm having an extension extending downwardly from one side portion of the pinch arm, a first lever connected operatively to the pinch arm and a second lever connected operatively to the first lever and provided with a felt for applying a brake force to a take-up reel. A torsion spring is disposed between the first lever and the second lever to urge the first lever and the second lever away from each other. Pivotal movement of the pinch arm causes the first lever to move pivotally, so that the second lever moves pivotally by virtue of the torsion spring to make the felt come into pressing contact with the take-up reel. In order to compress the torsion spring and thus increase the brake force applied to the take-up reel by the felt, the first lever and the second lever have a pin and a cam slot receiving the pin, respectively.

13 Claims, 5 Drawing Sheets

REEL BRAKE DEVICE OF DECK IN CAMERA-INTEGRATED TYPE VIDEO CASSETTE RECORDER SYSTEM

BACKGROUND OF THE INVENTION

1. Field of the Invention

The present invention relates to a reel brake device of a deck in a camera-integrated type video cassette recorder system, and more particularly to a reel brake device of a deck in a camera-integrated type video cassette recorder system, wherein a reverse brake force is applied to a take-up reel.

2. Description of the Prior Art

Referring to FIGS. 1 and 2, there is illustrated an example of a conventional reel brake device capable of applying a reverse brake force to a take-up reel.

First, the meaning of "a reverse brake" which has been mentioned above and will be mentioned hereinafter will now be explained. Take-up reel is a reel for taking up a tape during the operation of a deck during play mode. Accordingly, an external effect on the take-up reel affects directly a video displayed on a screen. In order to minimize such an external effect, therefore, a proper brake force is optionally applied to the take-up reel during the operation of the deck during play mode. The brake force absorbs a slight effect exerting externally on the tape. A brake which is provided for the purpose of applying such a brake force to the take-up reel means the reverse brake.

As shown in FIGS. 1 and 2, the conventional reel brake device comprises a cam gear 12 being rotatable in clockwise and counterclockwise directions and having a curved cam 12' and a slider 9 slidably mounted to a chassis 13 of a deck by means o f pins 10 inserted in slots 13' formed at the chassis 13. The slider 9 has at its upper end a cam follower following the cam 12' of cam gear 12 to move the slider 9 upwardly along the chassis 13. A tension spring 11 is mounted to the upper end of slider 9 to always urge the slider 9 upwardly. To the lower end of slider 9, a link 5 is pivotally mounted at its one end, by means of a pin 8. The link 5 has a slot 5' in which a pin 6 fixed to the chassis 13 is inserted. As the slider 9 moves upwardly and downwardly, the link 5 pivots about the pin 8 while the pivotal movement is guided by the cooperation between the slot 5' and the pin 6. The reel brake device also comprises a reverse brake 2 pivotally mounted to the chassis 13. The reverse brake 2 has one end being in contact with the other end of link 5 and the other end carrying a felt 3 coming into contact with the take-up reel 1 selectively. A tension spring 4 is connected to the reverse brake 2, so as to urge the reverse brake 2 in a direction coming into contact with the take-up reel 1.

In FIGS. 1 and 2, the reference numeral "14" denotes a pinch arm pivotally mounted to the chassis of the deck. The pinch arm 14 has a pinch roller 15 rotatably supported on the pinch arm 15. During a stop mode, the pinch roller 15 receives the power from a separate drive source and moves to a position in which it is spaced apart from the a capstan shaft 16 mounted to the chassis of the deck. During play mode, the pinch roller 15 comes into pressing contact with the capstan shaft 16, as shown in FIG. 3.

Now, the operation of the conventional reel brake device will be described.

During the stop mode, the slider 9 is moved to its lower position by the action of the curved cam 12' of cam gear 12 and stopped at the position, as shown in FIG. 1. By this movement of slider 9, the link 5 pivots about the pin 8 in a clockwise direction while the pivotal movement is guided by the cooperation between the slot 5' and the pin 6. Accordingly, the link 5 pushes at the other end thereof the one end of reverse brake 2 so that the reverse brake 2 pivots in a direction that the felt 3 is spaced away from the take-up reel 1, against the urging force of tension spring 4. Thus, the reverse brake 2 is maintained to be spaced apart from the take-up reel 1 at the stop mode.

During the play mode, the cam gear 12 rotates in counter-clockwise, as shown in FIG. 2. By this rotation, the force which has been applied to the slider 9 by the cam gear 12 to maintain it at its lower position is released. As a result, the slider 9 is moved upwardly to its upper position in which the pins 10 come into contact with the upper ends of slots 13', by the urging force of tension spring 11. By the upward movement of slider 9, the link 5 pivots about the pin 8 in counter-clockwise direction while the pivotal movement is guided by the cooperation between the slot 5' and the pin 6. As a result, the link 5 moves away from the reverse brake 2, so that the reverse brake 2 rotates clockwise by the urging force of tension spring 4, thereby causing the felt 3 to come into pressing contact with the take-up reel 1. Thus, the reverse brake 2 applies a brake force to the take-up reel 1 during play mode.

However, the above-mentioned reel brake device requires many elements (totally, 14 elements), such as the link, the cam gear, etc., for switching the transmission of brake force to the take-up reel, resulting in a complexity in construction and an inefficiency in compactness. Such a great number of elements also causes an increase in manufacture cost and a decrease in reliability.

SUMMARY OF THE INVENTION

Therefore, the present invention has been made in view of the above-mentioned prior art problem and an object of the invention is to provide a reel brake device of a deck of a camera-integrated type video cassette recorder system, capable of applying a brake force to a take-up reel by a drive force of a pinch arm, without using a separate driving system, thereby simplifying the overall construction and improving the reliability.

In accordance with the present invention, this object can be accomplished by providing a reel brake device of a deck in a camera-integrated type video cassette recorder system, comprising: a pinch arm pivotally mounted at one end thereof to a chassis of the deck and at the other hand a pinch roller adapted to selectively come into contact with a capstan shaft of the deck, the pinch arm also having an extension extending downwardly from one side portion of the pinch arm; a first lever pivotally mounted at one end thereof to a lever shaft fixed to the chassis of the deck and provided at one side portion thereof with a pin extending downwardly, the first lever also having the other end being able to come into contact with the extension of the pinch arm; a second lever pivotally mounted at one end thereof to the lever shaft beneath the first lever and provided with a cam slot receiving the pin of the first lever, the second lever also having at the other end thereof a felt adapted to selectively come into contact with a take-up reel to apply a brake force thereto; and a torsion spring disposed between the first lever and the second lever and adapted to urge the first lever and the second lever away from each other, the torsion spring having a coil portion fitted around the lever shaft and both ends being connected to the first lever and the second lever respectively. A tension spring is connected at both ends thereof to a pin fixed to the chassis of the deck and the other side portion of the first lever, so as to urge the first lever such that the other end of the first lever is in contact with the extension of the pinch arm.

In the above construction, the pinch arm pivots in counter-clockwise direction during play mode, to make the pinch roller come into contact with the capstan shaft. By this pivotal movement of the pinch arm, the first lever which is in contact with the extension of the pinch arm moves pivotally against the force of the torsion spring. During the pivotal movement of the first lever, the pin of the first lever moves along the cam slot of the second lever. Simultaneously with the pivotal movement of the first lever, the second lever moves pivotally by virtue of the torsion spring so that felt comes into contact with the take-up reel. Thus, a reverse brake force corresponding to the urging force of the torsion spring is applied to the take-up reel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following description of embodiments with reference to the accompanying drawings which are given by way of illustration only, and thus are not limitative of the present invention, and in which.

DETAILED DESCRIPTION OF THE PREFERRED EMBODIMENTS

Figure 1:
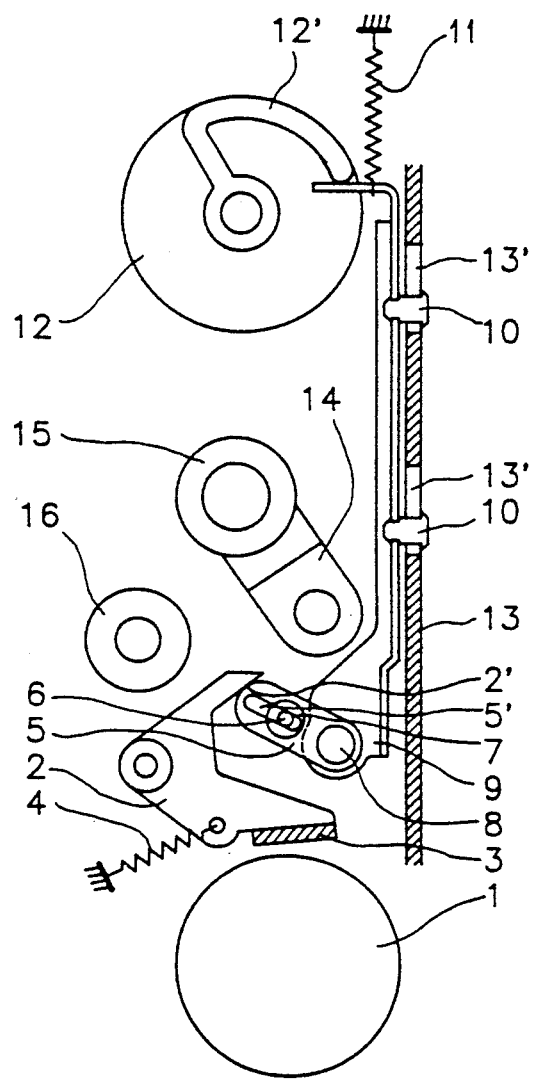
FIG. 1 is a sectional plan view of a conventional reel brake device, showing the reel brake device during stop mode.
Figure 2:
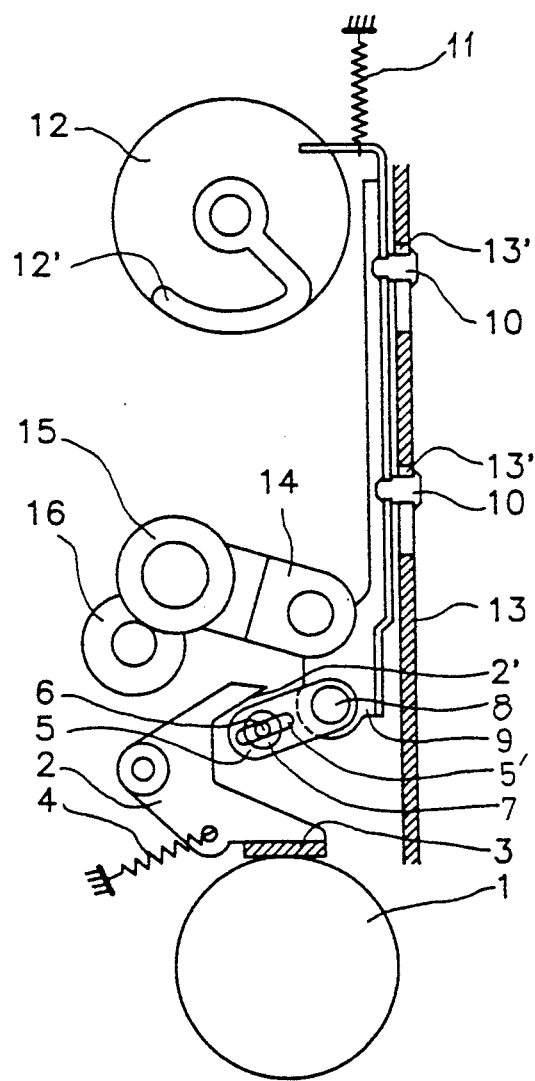
FIG. 2 is a sectional plan view of the conventional reel brake device, showing the device during play mode.
Figure 3:
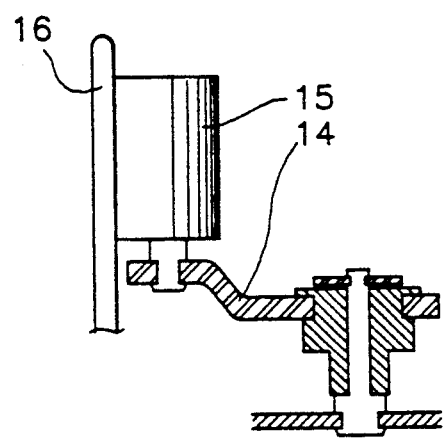
FIG. 3 is a sectional view of a pinch arm and a pinch roller disposed near the conventional reel brake device.
Figure 4:
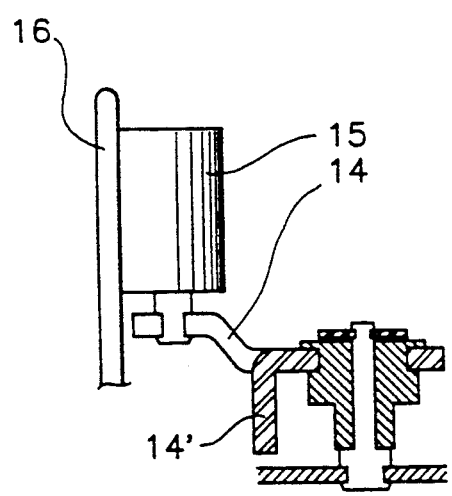
FIG. 4 is a sectional view, similar to FIG. 3, of a reel brake device according to the present invention, showing a pinch arm having an extension for providing a drive force for the device and a pinch roller.

Referring to FIGS. 4 to 7, there is illustrated a reel brake device of a deck in a camera-integrated type video cassette recorder system in accordance with the present invention. As shown in FIGS. 4 to 7, the reel brake device comprises a pinch arm 14 pivotally mounted at one end thereof to a chassis 13 of the deck. The pinch arm 14 has at the other end thereof a pinch roller 15 rotatably supported thereto. The pinch arm 14 also has an extension extending downwardly from one side portion of the pinch arm 14. During stop mode, the pinch arm 14 moves to a stop position in which the pinch roller 15 is spaced apart from a capstan shaft 16 disposed near the pinch arm 14. During play mode, the pinch arm 14 moves to a play position in which the pinch roller 15 comes into pressing contact with the capstan shaft 16. The reel brake device also comprises a first lever 17 pivotally mounted at one end thereof to a lever shaft 20 fixed to the chassis 13. The first lever 17 has a pin 17' extending downwardly from one side portion of the first lever 17. At the other end, the first lever 17 comes into contact with the extension 14' of pinch arm 14, selectively. Beneath the first lever 17, a second lever 18 is pivotally mounted to the lever shaft 20. The second lever 18 has a cam slot 18' receiving the pin 17' of first lever 17. At the other end of the second lever 18, a felt 3 is provided which selectively comes into contact with a take-up reel 1 to apply a brake force thereto. As the pinch arm 14 moves pivotally from its stop position to its play position, the extension 14' of pinch arm 14 pushes the first lever 17 so that the first lever 17 moves pivotally about the lever shaft 20, thereby causing the pin 17 moving along the cam slot 18' to push one end of the cam slot 18' and thus the second lever 18 to move pivotally to a position in which the felt 3 comes into pressing contact with the take-up reel 1. Between the first lever 17 and the second lever 18, a torsion spring 19 is disposed which has a coil portion fitted around the lever shaft 20. The torsion spring 19 is mounted at both ends thereof to the first lever 17 and the second lever 18, to urge the levers 17 and 18 in directions so that they move away from each other, respectively. A tension spring 23 is also provided which has one end connected to a pin 22 fixed to the chassis 13 and the other end connected to the other side portion of the first lever 17. The tension spring 23 always urges the first lever 17 so that the other end of the first lever 17 is in contact with the extension 14' of the pinch arm 14. In order to prevent the first lever 17, the torsion spring 19 and the second lever 18 from separating from the lever shaft 20, a snap ring 21 is fitted around the upper end of the lever shaft 20.

The operation of the reel brake device having the abovementioned construction according to the present invention will now be described.

Figure 5:
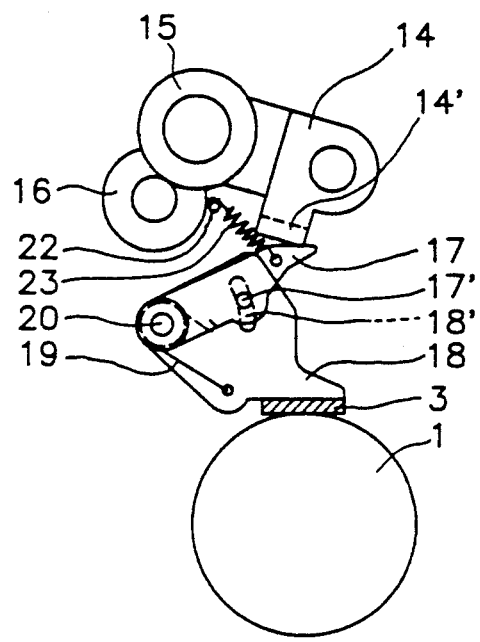
FIG. 5 is a sectional plan view of the overall construction of the reel brake device according to the present invention, showing the device during play mode.
Figure 6:
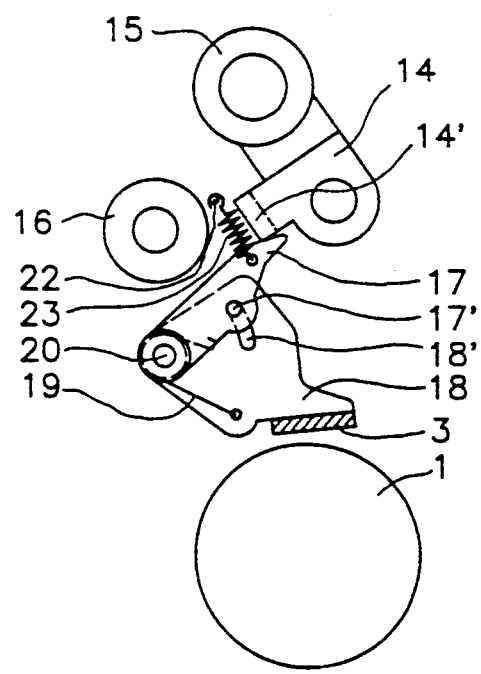
FIG. 6 is a sectional plan view similar to FIG. 5, showing the device during stop mode.
Figure 7:
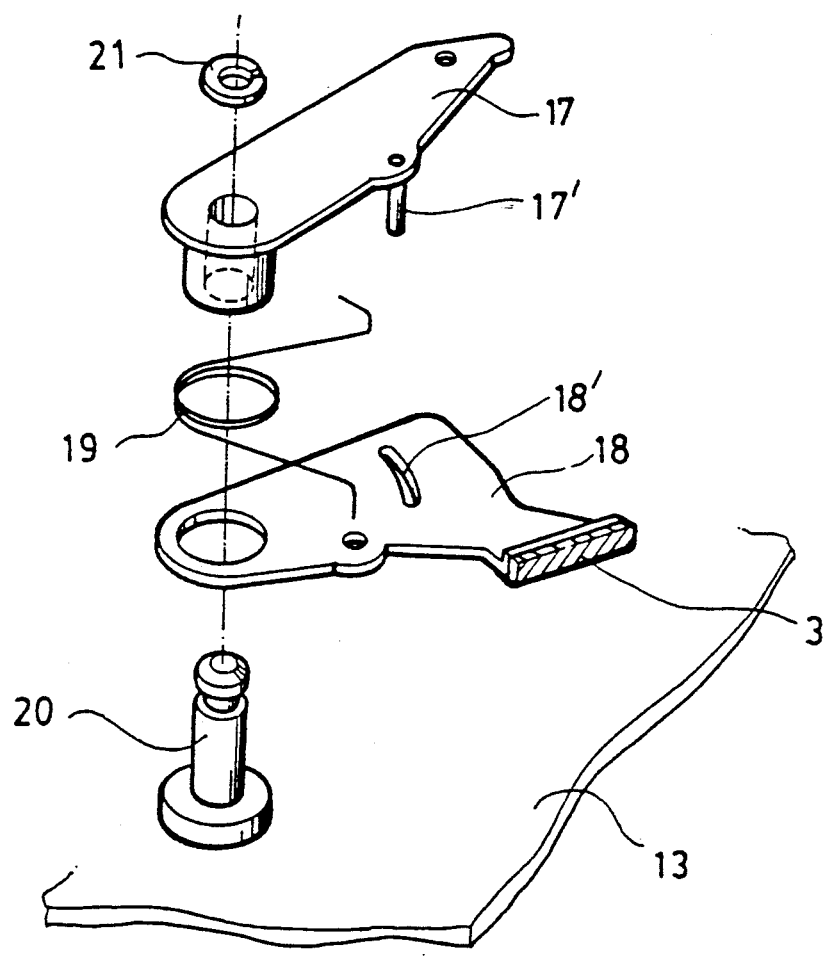
FIG. 7 is an exploded perspective view of the reel brake device according to the present invention.

During play mode, the pinch arm 14 pivots in 9 counter-clockwise direction from its stop position shown in FIG. 6, so that the pinch roller 15 comes into pressing contact with the capstan shaft 16, as shown in FIG. 5. By this pivotal movement of pinch arm 14, the first lever 17 which is in contact with the extension 14' of pinch arm 14 pivots about the lever shaft 20 in a clockwise direction, against the urging force of the tension spring 23. Simultaneously with the pivotal movement of the first lever 17, the second lever 18 pivots in a clockwise direction, by virtue of the torsion spring 19 urging the levers 17 and 18 in directions to move away from each other. The pivotal movement of the second lever 18 is continued until its felt 3 comes into contact with the take-up reel 1.

During these pivotal movements of the first and second levers 17 and 18, the pin 17' of the first lever 17 is held at a position in which it is in contact with the upper end of the slot 18' of the second lever 18, as shown in FIG. 6. Even after the felt 3 of the second lever 18 comes into contact with the take-up reel 1, the pivotal movement of the first lever 17 is continued since the pivotal movement of pinch arm 14 is carried out until the pinch roller 15 comes into contact with the capstan shaft 16. During the pivotal movement of the first lever 17, the pin 17' of the first lever 17 moves along the slot 18' of the second lever 18 and compresses the torsion spring 19.

After the pinch roller 15 comes into pressing contact with the capstan shaft 16, the felt 3 is pressed against the take-up reel 1 at a proper pressure by the urging force of the torsion spring 19 and thus applies a brake force to the take-up reel 1. That is, the urging force of the torsion spring 19 is utilized as the brake force.

Thus, during play mode, the first lever 17 and the second lever 18 operatively connected thereto move according to the pivotal movement of the pinch arm 14, so that the felt 3 attached to the second lever 18 comes into pressing contact with the take-up reel 1 by the urging force of the torsion spring 19, thereby applying a reverse brake force to the take-up reel 1. Accordingly, external effect which may be possibly applied to the take-up reel 1 can be absorbed by the reverse brake force so that the quality of videos displayed on a screen can be improved.

On the other hand, during stop mode, the pinch arm 14 moves pivotally in clockwise from its play position shown in FIG. 5 to its stop position in which the pinch roller 15 is spaced apart from the capstan shaft 16. As the pinch arm 14 moves pivotally as mentioned above, the first lever 17 pivots in a counter clockwise direction by the urging forces of the torsion spring 19 and tension spring 23 while the pin 17' of the first lever 17 moves along the slot 18' of the second lever 18 until it comes into contact with the upper end of slot 18'. After the pin 17' of the first lever 17 comes into contact with the upper end of slot 18' of the second lever 18, the first lever 17 and the second lever 18 pivot together in a counter clockwise direction.

As the second lever 18 pivots counter clockwise, the felt 3 attached to the second lever 18 is spaced away from the take-up reel 1 and thus releases the brake force.

As is apparent from the above description, the present invention provides a reel brake device with a simple construction requiring a few elements, capable of achieving improvements in compactness, reliability and a reduction in manufacture cost.

Although the reel brake device of the present invention has been described as being applied to a deck in a camera-integrated type video cassette recorder system, it may be also applied to a deck in a video cassette recorder and other appliances requiring a reverse brake for a take-up reel.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A reel brake device for a deck in a video cassette recorder system, comprising:

a pinch arm pivotally mounted at one end thereof to a chassis of the deck and at the other to a pinch roller for selectively contacting a capstan shaft of the deck, the pinch arm also having an extension extending from one side portion of the pinch arm;

a first lever pivotally mounted at one end thereof to a lever shaft fixed to the chassis of the deck and provided at one side portion thereof with a pin, the first lever also having the other end being contactable with the extension of the pinch arm;

a second lever pivotally mounted at one end thereof to the lever shaft beneath the first lever and provided with a cam slot receiving the pin of the first lever, the second lever also having at the other end thereof a felt selectively contacting a take-up reel to apply a brake force thereto; and a torsion spring disposed between the first lever and the second lever for urging the first lever and the second lever away from each other, the torsion spring having a coil portion fitted around the lever shaft and both ends connected to the first lever and the second lever respectively.

2. The reel brake device in accordance with claim 1, further comprising a tension spring connected at both ends thereof to a pin fixed to the chassis of the deck and the other side portion of the first lever, the tension spring urging the other end of the first lever to contact the extension of the pinch arm.

3. A reel brake device of a deck in a video cassette recorder system, comprising:

a pinch arm pivotally mounted at one end thereof to a chassis of the deck for providing a force for driving the reel brake device;

first means operatively connected to the pinch arm for pivotally moving in response to pivotal movement of the pinch arm, the first means having a pin;

second means operatively connected to the first means for pivotally moving in response to pivotal movement of the first means, the second means applying a braking force to a tape-up reel, the second means having a cam slot receiving the pin of the first means for pivotally moving the second means by pivotal movement of the first means; and urging means for applying opposite urging forces to the first means and the second means.

4. The reel brake device in accordance with claim 3, further comprising a spring connected between the first means and the chassis of the deck for always urging the first means to be in contact with the pinch arm.

5. The reel brake device in accordance with claim 3, wherein the pinch arm has an extension for transmitting the pivotal movement of the pinch arm to the first means.

6. The reel brake device in accordance with claim 3, wherein the first means and the second means are mounted to a lever shaft fixed to the chassis of the deck, so as to pivot about the lever shaft.

7. The reel brake device in accordance with claim 3, wherein the urging means comprises a torsion spring connected at both ends thereof to the first means and the second means.

8. A reel brake device of a deck in a video cassette recorder system, comprising:

a pinch arm pivotally mounted at one end thereof to a chassis of the deck for providing a force for driving the reel brake device;

first means operatively connected to the pinch arm for pivotally moving in response to pivotal movement of the pinch arm;

second means operatively connected to the first means for pivotally moving in response to pivotal movement of the first means, the second means applying a braking force to a take-up reel;

urging means for applying opposite urging forces to the first means and the second means; and a lever shaft fixed to the chassis of the deck, the first and second means being mounted to the lever shaft to pivot about the lever shaft.

9. The reel brake device in accordance with claim 8, further comprising a spring connected between the first means and the chassis of the deck for always urging the first means to be in contact with the pinch arm.

10. The reel brake device in accordance with claim 8, wherein the pinch arm has an extension for transmitting the pivotal movement of the pinch arm to the first means.

11. A reel brake device of a deck in a video cassette recorder system, comprising:

a pinch arm pivotally mounted at one end thereof to a chassis of the deck for providing a force for driving the reel brake device;

first means operatively connected to the pinch arm for pivotally moving in response to pivotal movement of the pinch arm;

second means operatively connected to the first means for pivotally moving in response to pivotal movement of the first means, the second means applying a braking force to a take-up reel; and urging means for applying opposite urging forces to the first means and the second means, the urging means comprises a torsion spring connected at both ends thereof to the first means and the second means.

12. The reel brake device in accordance with claim 11, further comprising a spring connected between the first means and the chassis of the deck for always urging the first means to be in contact with the pinch arm.

13. The reel brake device in accordance with claim 11, wherein the pinch arm has an extension for transmitting the pivotal movement of the pinch arm to the first means.

* * * * *